United States Patent [19]
Yajima et al.

[11] 4,361,691
[45] Nov. 30, 1982

[54] PROCESS FOR PRODUCTION OF HEAT-RESISTANT COMPOUNDS

[75] Inventors: Seishi Yajima, Tohokudaigaku shukusha 4-2, 843, Ohnuki-machi, Oharai-machi, Higashiibaraki-gun, Ibaraki-ken, Japan; Kiyohito Okamura; Toetsu Shishido, both of Oharai, Japan

[73] Assignees: NTN Toyo Bearing Co., Ltd., Osaka; Seishi Yajima, Ibaraki, both of Japan

[21] Appl. No.: 260,570

[22] Filed: May 5, 1981

[30] Foreign Application Priority Data

May 13, 1980 [JP] Japan .................................. 55-62215

[51] Int. Cl.$^3$ ............................................. C08G 77/04
[52] U.S. Cl. ..................... 528/28; 525/475; 260/429.3; 260/429.5; 260/448 R
[58] Field of Search ......................... 260/429.3, 429.5; 528/28; 525/475

[56] References Cited

U.S. PATENT DOCUMENTS

| | | | |
|---|---|---|---|
| 2,757,152 | 7/1956 | Solomon | 260/429.3 |
| 3,046,269 | 7/1962 | Cohen et al. | 260/429.3 X |
| 3,378,520 | 4/1968 | Sattlegger et al. | 260/429.3 X |
| 3,541,126 | 11/1970 | Baronnier et al. | 260/429.5 X |
| 3,625,934 | 12/1971 | Rinse | 260/429.5 X |
| 3,758,535 | 9/1973 | Vizurraza | 260/429.5 |
| 3,940,370 | 2/1976 | Di Salvo | 528/28 X |
| 3,993,835 | 11/1976 | Miedaner | 260/429.5 X |
| 4,157,978 | 6/1979 | Llenado | 260/429.5 X |
| 4,242,487 | 12/1980 | Yajima et al. | 528/5 X |
| 4,334,051 | 6/1982 | Yajima et al. | 525/475 X |

Primary Examiner—Helen M. S. Sneed
Attorney, Agent, or Firm—Ladas & Parry

[57] ABSTRACT

A process for producing a heat-resistant compound, which comprises adding a diamine to an organic solvent-soluble metallosiloxane compound whose main chain consists of siloxane bonds $+Si-O+$ and metalloxane bonds $+M-O+$ wherein M represents at least one element selected from the group consisting of Ti, Zr, V, P, Al, Fe, Cr, Co, Ni, Ge, Sn, As, Mg, Pb and Sb, and heating the mixture to 50° to 450° C. in the presence or absence of an organic solvent.

5 Claims, No Drawings

PROCESS FOR PRODUCTION OF HEAT-RESISTANT COMPOUNDS

BACKGROUND OF THE INVENTION

This invention relates to a process for producing heat-resistant semi-inorganic compounds.

Polyimides have been known to be highly heat-resistant organic polymers. Because of their organic nature, however, when heated in the air at 500° C. or higher, they decompose and gasify, leaving no residue.

It is an object of this invention to provide semi-inorganic compounds having superior heat resistance, flexibility and chemical resistance and being free from the defects of the aforesaid organic polymers.

SUMMARY OF THE INVENTION

According to this invention, there is provided a process for producing a heat-resistant compound, which comprises adding a diamine to an organic solvent-soluble metallosiloxane compound whose main chain consists of siloxane bonds —Si—O— and metalloxane bonds —M—O— wherein M represents at least one element selected from the group consisting of Ti, Zr, V, P, Al, Fe, Cr, Co, Ni, Ge, Sn, As, Mg, Pb and Sb, and heating the mixture to 50° to 450° C. in the presence of absence of an organic solvent.

The heat-resistant compound obtained by the process of this invention has the property of finally changing to an inorganic compound and retaining its form when heated in the air to 500° C. or higher.

DETAILED DESCRIPTION OF THE INVENTION

The metallosiloxane compound used as a first starting material in the process of the invention is a compound which essentially contains siloxane bonds $-(\text{Si}-\text{O})-$ and metalloxane bonds $-(\text{M}-\text{O})-$ and is soluble in organic solvents (e.g., benzene, toluene, xylene, acetone, tetrahydrofuran, n-butyl ether and acetylacetone). It may be at least one of monomer, oligomer and polymer.

In the present application, the siloxane bonds are expressed by the simplified formula $-(\text{Si}-\text{O})-$ in accordance with the customary practice. As is well known, however, the siloxane bonds expressed by the above formula include three siloxane bonds, namely a difunctional group of the formula

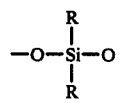

a trifunctional group of the formula

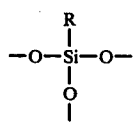

and a tetrafunctional group of the formula

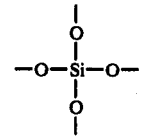

wherein R represents an organic group. These three kinds of siloxane bonds are structural units which form the skeleton of the metallosiloxane compound.

The metallosiloxane compound used in the invention should be such that most of the silicon atoms of the siloxane bonds should contain at least one side-chain organic group bonded thereto. This means that most of the siloxane bonds in the metallosiloxane compound are difunctional or trifunctional siloxane bonds, and the proportion of the tetrafunctional siloxane bonds is minor. Generally, as the content of the tetrafunctional siloxane bonds increases, the metallosiloxane compound has an increased content of crosslinked structure and becomes insoluble in organic solvents. The metallosiloxane compound used in this invention may contain a minor amount of tetrafunctional siloxane bonds, but the amount should be restricted within the range which does not affect their solubility in organic solvents. Preferably, the siloxane bonds of the metallosiloxane compound consist substantially of difunctional and/or trifunctional siloxane bonds.

Each silicon atom in the siloxane bonds has at least one side-chain organic group bonded thereto. The organic group is at least one group selected from lower alkyl groups, a phenyl group, fluoroalkyl groups, a nitrile group, a vinyl group and hydrogen.

The metalloxane bonds $-(\text{M}-\text{O})-$ of the metallosiloxane compound (M is at least one element selected from Ti, Zr, V, P, Al, Fe, Cr, Co, Ni, Ge, Sn, As, Mg, Pb and Sb) include difunctional to pentafunctional groups, but for the same reason as mentioned above with regard to the siloxane bonds, most of the metalloxane bonds in the metallosiloxane compound used in this invention are difunctional groups and/or trifunctional groups, and it contains little or no tetrafunctional or higher groups. Preferably, two side-chain groups bonded to the metal atom of the difunctional group, and one side-chain group bonded to the metal atom of the trifunctional groups are alkoxy groups because the alkoxy groups offer reactive sites for reaction with a diamine, the other starting material, to form a heat-resistant high molecular compound.

The ratio of the number of the siloxane bonds to that of the metalloxane bonds in the metalloziloxane compound used in the invention (Si/M) is preferably within the range of from 1:4 to 100:1.

The metallosiloxane compound used in this invention can be produced by methods which are usually practiced. Typical examples are as follows:

(a) Co-hydrolysis of an organochlorosilane and a metal alkoxide.

(b) Dehydrochlorinating condensation of an organosilanol and a metal chloride.

(c) Dealcoholizing condensation of an organosilanol and a metal alkoxide.

When the metallosiloxane compound is to be prepared by the above methods (a) to (c), the —Si—O—M—O— bond is formed as schematically shown below.

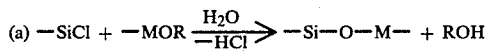

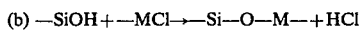

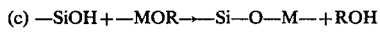

The method of synthesizing the metallosiloxane compound is disclosed in detail, for example in Inorganic Polymers (F. G. A. Stone, Academic Press, 1962).

One example of the metallosiloxane compound in which M is Ti is represented by the following formula.

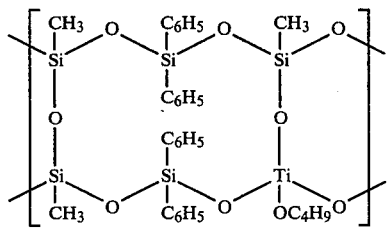

The diamine to be reacted with the organometallosiloxane compound in the process of this invention is at least one diamine selected from primary, secondary and tertiary diamines. Specifically, it is at least one diamine selected from $NH_2RNH_2$, $NH_2RNHR$ and $RHN\cdot R\cdot NHR$ in which R is at least one member selected from aliphatic hydrocarbons, aromatic hydrocarbons and heterocyclic hydrocarbons.

Examples of the primary diamines are aliphatic diamines such as ethylenediamine and hexamethylenediamine aromatic diamines typified by o-, m- and p-phenylenediamines, and diamines containing a heteroatom such as an oxygen or sulfur atom, such as p,p'-oxydianiline and p,p'-diaminodiphenylsulfone. Urea ($NH_2CONH_2$) which slightly deviate from the above general formula can also be used. The use of aromatic diamines as the primary diamines is preferred to increase heat resistance.

Acetamidine, guanidine and piperazine are well known secondary and tertiary diamines, but other secondary and tertiary diamines can also be used. Cyclic diamines in which at most one —H in

is replaced by a methyl group are preferred in order to increase heat resistance and permit reaction at low temperatures.

Among the aforesaid diamines, aromatic primary diamines (particularly, p-phenylenediamine) are generally preferred, and secondary diamines containing a nitrogen atom on the ring are more preferred.

The amount of the diamine to be mixed with the metallosiloxane compound is adjusted such that the ratio of the total number of the Si and M atoms in the metallosiloxane to the number of N atoms in the diamine is within the range of from 100:5 to 100:120. If the amount of the diamine is less than the specified limit, the heat resistance of the resulting product does not show a marked improvement. If the amount exceeds the specified limit, the diamine may sometimes remain unreacted.

Preferably, the reaction of the metallosiloxane and the diamine is carried out in the presence of a solvent in order to ensure uniform reaction. If desired, however, it may be carried out in the absence of a solvent. When no solvent is used, the reaction is carried out preferably while melting the diamine by heating the reactant mixture to a temperature slightly above the melting point of the diamine. The solvent which may be used is properly selected generally from alcohols, ketones, ethers and esters. The reaction in the presence of a solvent may be carried out under refluxing of the solvent by heating the reactant mixture to the boiling point of the solvent. Or the reaction may be carried out by heating the reactant mixture at a suitable rate of temperature raising so as to avoid rapid evaporation of the solvent and continuing the heating until nearly all of the solvent is removed from the reaction system by evaporation. In the latter procedure, it is preferred to use an organic solvent having a boiling point near the melting point of the diamine used. For example, when p-phenylenediamine (m.p. 140° C.) is used as the diamine, the solvent is preferably n-amyl alcohol (b.p. 137° C.), butyrone (b.p. 144° C.), acetylacetone (b.p. 140° C.), i-amyl acetate (b.p. 148° C.), etc.

The reaction temperature used in the process of this invention differs depending upon the diamine used, and cannot be definitely determined. It is usually from 50° to 450° C., preferably 50° to 250° C. One characteristic feature of the invention is that the reaction can be completed at relatively low temperatures.

Advantageously, the reaction in the process of the invention can be carried out not only in an atmosphere of a non-oxidizing gas such as nitrogen, hydrogen and other inert gases such as helium and argon, but also in an atmosphere of an oxidizing gas such as oxygen-containing gases (e.g., air).

The heat-resistant compounds obtained by the process of this invention are characterized by the fact that they are easily soluble in organic solvents such as tetrahydrofuran and N-methyl-2-pyrrolidone, soften at high temperatures, and have processability even in an oxidizing atmosphere. Accordingly, the heat-resistant compounds in accordance with this invention can be easily molded into various articles. This is contrastive with the fact that since conventional heat-resistant polymers such as wholly aromatic polyimides or polytetrafluoroethylene resins are insoluble in solvents or decompose without softening, they have low processability and are useful only in limited applications. Furthermore, since the heat-resistant compounds of the invention scarcely react with oxygen at a temperature of up to about 500° C. and have high oxidation resistance as demonstrated by the results of their thermogravimetric analysis in the air, they can be used not only as molded articles, but also as various ceramic powders, bonding agents for metal powders, paints, etc. It is especially noteworthy that heat-resistant and corrosion-resistant electric cables can be easily obtained by coating the compounds of the invention on electric wires and cables made of aluminum, copper, etc.

If desired, the compounds in accordance with this invention can be increased in softening point and heat-cured by re-heating them to a high temperature above the softening point thereof. Accordingly, by processing the compounds of the invention at relatively low temperature, and thereafter heat-treating the resulting articles, materials having excellent heat resistance can be obtained. An especially useful application is in the coating of the compound of the invention on the surface of aluminum. The coated aluminum is then heated to 550° to 600° C. in the air to form an article in which the adhesion of the compound to aluminum is very good and the coated layer is nearly completely black and has superior oxidation resistance and corrosion resistance. The resulting article is very suitable as a plate for collecting heat such as solar heat.

The following Examples illustrate the present invention further.

EXAMPLE 1

Three moles of diphenylsilane diol and 2 moles of titanium tetrabutoxide were weighed and xylene was added. They were reacted under reflux at 150° C. for 1 hour in an atmosphere of nitrogen gas. After the reaction, the insoluble matter was removed by filtration, and the xylene solvent was removed by an evaporator. The resulting intermediate product was further polymerized at 300° C. for 1 hour in an atmosphere of nitrogen gas to give a yellow transparent polymer. The infrared absorption spectrum of the resulting polymer showed a slight absorption of Si-OH in the vicinity of 3600 cm$^{-1}$, an absorption of $C_4H_9$ in the vicinity of 2900 cm$^{-1}$, an absorption of the benzene ring in the vicinity of 1600 cm$^{-1}$ and 1400 cm$^{-1}$, an absorption of Si—O at 1150-1000 cm$^{-1}$, and an absorption of Ti—0 in the Ti—O—Si bond in the vicinity of 900 cm$^{-1}$. The resulting polymer contained Ti, Si and O as a skeleton and had a phenyl group on the side chain of Si, and a butoxy group on the side chain of Ti.

To 9 g of the resulting titanosiloxane compound was added 3 g of p-phenylenediamine, and the mixture was maintained at 100° C. for 1 hour in 20 ml of butanol to dissolve the p-phenylenediamine completely. The mixture was gradually heated to 140° C. in the air, and maintained at 140° C. for 5 hours. The reaction mixture was then cooled to give a dark violet resinous compound. The resulting compound was easily soluble in tetrahydrofuran, and softened at 160° C. When the compound was thermogravimetrically analyzed in the air at a temperature raising rate of 5° C. per minute, it was found that it began to decrease in weight at 290° C. and the ratio of its weight loss was 5% at 490° C. and 43% at 800° C.

EXAMPLE 2

The same reaction as in Example 1 was carried out except that hexamethylenediamine or urea was used instead of the p-phenylenediamine. Resinous compounds having nearly the same appearance as in Example 1 were obtained. These resins showed a weight loss ratio of 50 to 53% when heated up to 800° C. in the air.

EXAMPLE 3

A polymer containing Zr, Si and O as a skeleton and having a phenyl group at the side chain of Si and a butoxy group at the side chain of Zr was prepared under the same conditions as in Example 1 except that the amount of the diphenylsilane diol was changed to 4 moles, and 1 mole of zirconium tetrabutoxide was used instead of 2 moles of titanium tetrabutoxide, and the polymerization was carrried out at 350° C. for 20 minutes in vacuum (10$^-$ to 10$^{-3}$ mmHg) instead of carrying it out at 300° C. for 1 hour in an atmosphere of nitrogen gas.

To 12 L g of the resulting zirconosiloxane was added 3 g of p-phenylenediamine, and they were reacted under the same conditions as in Example 1 to give a dark violet resinous compound. This compound was soluble in tetrahydrofuran and softened at 150° C. When it was thermogravimetrically analyzed in the air at a temperature-raising rate of 5° C. per minute, it was found that it began to decrease in weight at 280° C., and its weight loss ratio was 5% at 470° C. and 50% at 800° C.

EXAMPLE 4

A polymer containing Ti, Al, Si and O as a skeleton and having a methyl group on the side chain of Si and isopropoxy groups on the side chains of Ti and Al was prepared under the same conditions as in Example 1 except that 3 moles of dimethylsilane diol, 1.8 moles of titanium tetraisopropoxide and 0.2 mole of aluminum isopropoxide were used as starting materials and the resulting intermediate product was polymerized at 330° C. for 1 hour in an atmosphere of nitrogen gas.

To 10 g of the resulting polymer was added 2 g of p-phenylenediamine and the mixture was maintained at 140° C. for 10 hours in 20 ml of acetylacetone. The mixture was then cooled to give a black brownish resinous substance.

When 10 ml of N-methyl-2-pyrrolidone was added to 2 g of the resinous substance, the resinous substance dissolved easily. The resulting solution was coated on the surface of metallic aluminum or nickel, and heated from room temperature to 120° C. at a rate of 2° C./min. and subsequently to 220° C. in the air at a rate of 10° C./min. A lustrous black coated layer of the above substance appeared on the surface of aluminum or nickel. The coated aluminum and nickel articles were each heated to 550° C. in the air and maintained at this temperature for 1 hour, and then cooled. The coated layer on the metal surfaces was still lustrous and adhered firmly to the metals. When the coated metals were each maintained for a week in an atmosphere of sulfurous acid gas (concentration 1000 ppm) at 150° C., no trace of corrosion was noted.

EXAMPLE 5

Thirty-five grams of titanium tetrabutoxide, 80 g of diphenylsilane diol, 20 g of p-phenylenediamine, 20 cc of acetylacetone and 300 cc of n-amyl alcohol were weighed into a three-necked flask equipped with a stirrer. The external wall of the flask was heated to 140° C., and the reaction was performed under reflux. The solvent was evaporated to give a brown solid. The solid product was dissolved in N-methyl-2-pyrrolidone, and the solution was coated on an aluminum plate washed with alkali, and baked in the air by heating it to 400° C. A coated film of good quality was obtained. The coated film had excellent heat stability in the air at high temperatures and excellent chemical resistance (e.g., resistance to acids and alkalies).

What we claim is:

1. A process for producing a heat-resistant compound, which comprises adding a diamine to an organic solvent-soluble metallosiloxane compound whose main chain consists of siloxane bonds —(Si—O)— and metalloxane bonds —(M—O)— wherein M represents at least one element selected from the group consisting of Ti, Zr, and Al, and heating the mixture to 50° to 450° C. in the presence or absence of an organic solvent.

2. The process of claim 1 wherein the ratio of the number of Si atoms constituting the siloxane bonds to that of M atoms constituting the metalloxane bonds (Si/M) is within the range of from 1:4 to 100:1.

3. The process of claim 1 wherein each Si atom in the metallosiloxane compound has at least one side-chain organic group bonded thereto, said organic group being at least one group selected from the group consisting of lower alkyl groups, a phenyl group, fluoroalkyl groups, a nitrile group, a vinyl group and hydrogen.

4. The process of claim 1 wherein the diamine is at least one compound selected from the group consisting of primary diamines, secondary diamines and tertiary diamines.

5. The process of claim 1 wherein the ratio of the total number of Si and M atoms in the metallosiloxane to the number of N atoms in the diamine is within the range of from 100:5 to 100:120.

* * * * *